United States Patent [19]

Barbera et al.

[11] Patent Number: 5,479,648
[45] Date of Patent: Dec. 26, 1995

[54] METHOD AND APPARATUS FOR SWITCHING CLOCK SIGNALS IN A FAULT-TOLERANT COMPUTER SYSTEM

[75] Inventors: David R. Barbera, Worcester; Franklin M. Savicki, Sheldonville; David E. Splitz, North Attleboro, all of Mass.

[73] Assignee: Stratus Computer, Inc., Marlboro, Mass.

[21] Appl. No.: 297,795

[22] Filed: Aug. 30, 1994

[51] Int. Cl.⁶ ............................. G06F 1/10; G06F 1/32
[52] U.S. Cl. ............................. 395/750; 364/DIG. 2; 364/948.8; 395/550
[58] Field of Search ............................. 395/550, 750

[56] References Cited

U.S. PATENT DOCUMENTS 4,823,262  4/1989  Calle ........................ 364/DIG. 1
5,155,840  10/1992 Niijima ........................ 395/550
5,274,678  12/1993 Ferolito et al. ........................ 375/108
5,291,528  3/1994  Vermeer ........................ 375/106

Primary Examiner—Thomas M. Heckler
Attorney, Agent, or Firm—Cesari and McKenna

[57] ABSTRACT

A clock switching circuit switches between clock signals generated by a local clock unit and those generated by a-system clock unit when disabling, and then subsequently enabling, the system clock unit. The clock switching circuit includes a plurality-of switching circuits that are arranged and configured to switch between the system and local clock units so as to provide a substantially uninterrupted stream of clock signals to selected components of a fault-tolerant computer system. This arrangement ensures that information stored on the selected components is not lost during disablement of the system clock unit.

18 Claims, 9 Drawing Sheets

METHOD AND APPARATUS FOR SWITCHING CLOCK SIGNALS IN A FAULT-TOLERANT COMPUTER SYSTEM

FIELD OF THE INVENTION

This invention relates generally to computer timing apparatus and, more particularly, to an apparatus and method for switching clock signals in a fault-tolerant synchronous computer system.

BACKGROUND OF THE INVENTION

A fault-tolerant computer system is generally composed of specially designed hardware and software components having improved tolerance to faults that enable their continuous operation. One of these components includes a system clock unit that generates and distributes clock signals to logic circuits located throughout the system. Preferably, the system clock unit generates clock pulses having fast cycle times that increase system performance by synchronizing high-speed operations of the logic circuits. However, continuous computer operation requires constant generation and transmission of these fast pulses by the system clock which, in turn, consumes significant amounts of power.

Many applications of the fault-tolerant computer do not require such high availability during non-working hours, such as weekends. For these applications, it may be desirable to conserve energy and reduce costs by periodically disabling the system clock. Yet, there is a requirement to maintain operation of selected computer components so that information relating to the "state" of the system can be accessed despite the absence of system clock signals. This information may be stored in memory devices resident on a remote connector interface component of the fault-tolerant system that is sequenced by a low-power, local clock unit. The present invention is concerned with switching between the system and local clock units in a manner that provides a continuous stream of clock signals to circuits of the computer system and, thus, uninterrupted operation of these selected components.

SUMMARY OF THE INVENTION

The present invention resides in a clock switching circuit for switching between clock signals generated by a local clock unit and those generated by a system clock unit when disabling, and then subsequently enabling, this latter unit. The clock switching circuit preferably comprises a plurality of interconnected switching circuits that are arranged and configured to switch between the local and system clock units so as to provide a substantially uninterrupted stream of clock signals to selected components of a fault-tolerant computer system. This arrangement ensures that information stored on the selected components is not lost during disablement of the system clock.

Specifically, the system clock unit may be disabled/ enabled in response to "power-down" and "power-up" commands entered on a console unit of the computer. These commands are received by a processor of a remote connector unit which, under control of its firmware, initiates appropriate power-down and power-up procedures, including the synchronizing and sequencing of the switching circuits.

In the illustrative embodiment, the switching circuits comprise a plurality of multiplexer circuits for passing clock signals among the selected components of the computer. More specifically, a first multiplexer is configured to pass input clock pulses generated by the system clock unit onto output lines coupled to a first set of input lines of a control multiplexer during normal operation of the fault-tolerant computer, i.e., when the system clock unit supplies clock pulses to the computer system. Simultaneously, a second multiplexer inhibits input clock pulses generated by the local clock unit from passing to its output lines so that low, logical ground signals are passed to those output lines coupled to a second set of input lines to the control multiplexer. Thereafter, the system clock pulses are passed through the control multiplexer and to buffer circuits for distribution to various components of the computer system.

Upon issuance of the power-down command and prior to disabling of the system clock unit, the firmware instructs the processor to assert a clock selection bit in a control register of the clock switching circuit. In response to this asserted clock selection signal, a novel clock control circuit generates enable signals, including an enable selection signal that configures the control multiplexer to switch its output from the first set of input lines to the second set of input lines. According to an aspect of the invention, the clock control circuit enables the control multiplexer to switch between its input lines without adversely impacting the integrity of the output clock signals. That is, the novel control circuit ensures that switching occurs when the input signals to the multiplexer are "low".

The enable signals are also employed to configure, at a later time, the first and second multiplexers. Specifically, the enable selection signal configures the second multiplexer to pass the clock pulses generated by the local clock unit onto the second set of input lines and through the control multiplexer to its output:lines, while an inverted enable selection signal generated by the clock control circuit configures the first multiplexer to pass logical ground signals onto the first set of input lines. The system clock unit is then disabled and the local clock pulses are supplied to the selected components.

Meanwhile, a novel clock-fault circuit scans the output of the system clock unit in search of a transition indicating the presence of system clock pulses. In accordance with another aspect of the invention, the clock-fault circuit constantly samples the output of the system clock at predetermined time intervals to determine whether a pulse transition occurs during those intervals. In response to detecting a transition, the clock-fault circuit generates a clock-fault signal that is stored as a deasserted clock-fault bit in a status register of the clock switching circuit.

Upon issuance of the power-up command, the processor's firmware "polls" on this clock-fault bit and, in response to its deassertion, deasserts the clock selection bit in the control register. This, in turn, causes the clock control circuit to alter the states of the enable and inverted enable selection signals, thus configuring the control multiplexer to switch its output lines from the second set of input lines to the first set. Again, the structure and operation of the clock control circuit ensures that switching occurs when the inputs signals are "low". Thereafter, the altered enable and inverted enable selection signals configure the first and second multiplexers to switch between their inputs and pass only the system clock pulses to the control multiplexer and onto the various computer components.

Advantageously, the clock switching circuit arrangement described herein ensures that a substantially uninterrupted stream of clock signals are provided to selected components of the fault-tolerant computer system to enable their continuous operation despite disabling/enabling of the system clock unit.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
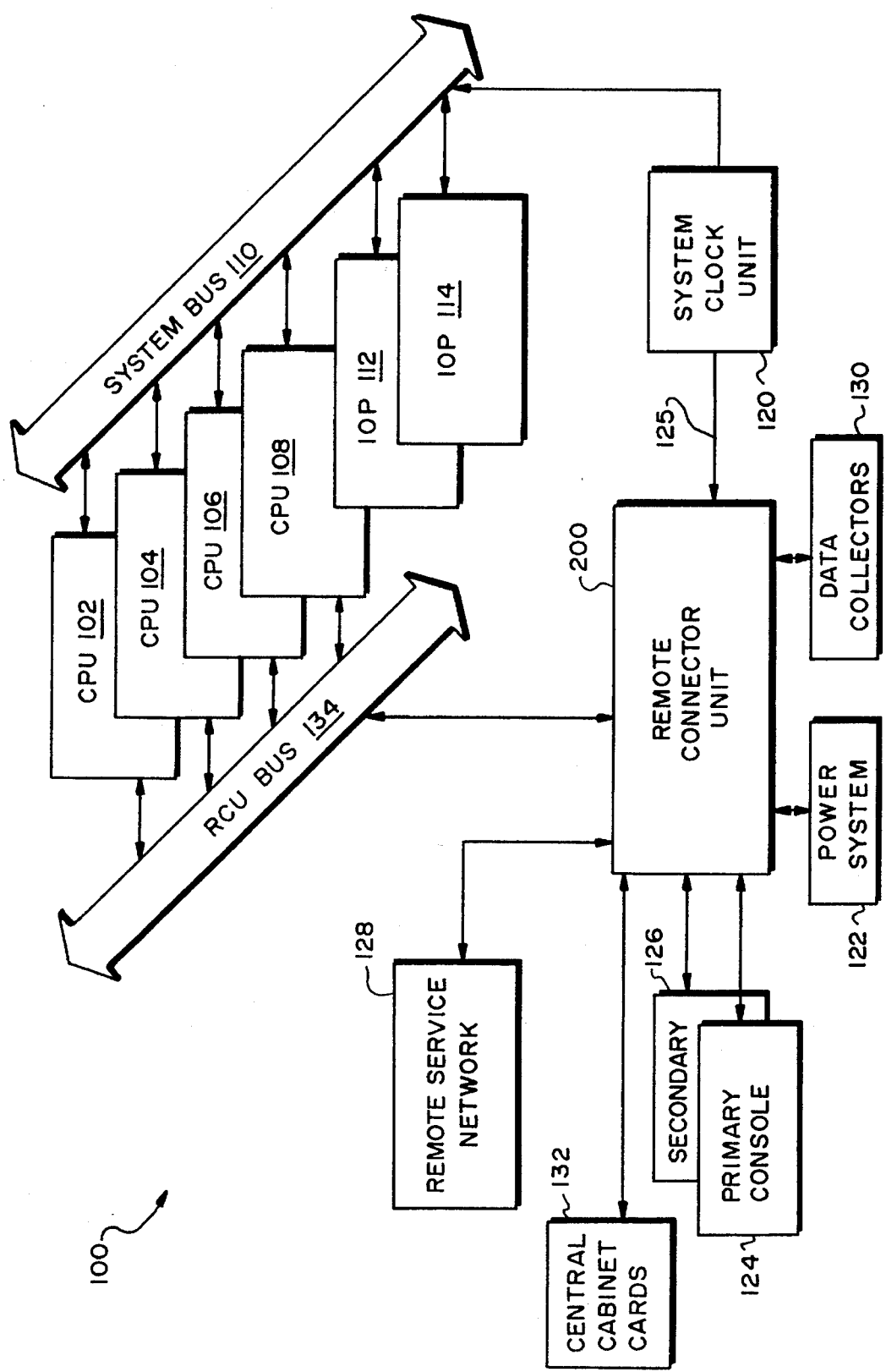
FIG. 1 illustrates relevant portions of a fault-tolerant computer system in which the novel clock switching circuit may be advantageously used.

FIG. 1 illustrates relevant components of a fault-tolerant computer system 100 including a plurality of central processing units (CPU) 102–108, a plurality of input/output processors (IOPs) 112–114 and a remote connector unit 200. Each CPU includes an array of memory devices (not shown) for storing information associated with application programs executing on the CPUs. The IOPs, in turn, perform input/output (I/O) operations with various I/O devices (not shown) and communicate the results of those operations to the CPUs via a high-speed, bidirectional synchronous bus 110. The bus 110 preferably synchronizes and sequences communication among the CPUs and IOPs using clock pulses having fast clock cycle times that are received from a system clock unit 120.

The remote connector unit (RCU) 200 provides a connector interface between components of the fault-tolerant system not connected to the system bus 110 and the CPUs 102–108. This interface is established over a RCU bus 134 interconnecting the RCU 200 and the CPUs 102–108. The RCU bus 134 is preferably a fault-tolerant multiplexed synchronous bus; therefore, the RCU and CPUs must communicate at the same phase and frequency over the bus 134, preferably in accordance with the clock pulses generated by the system clock unit 120.

In the illustrative embodiment of the invention, the RCU 200 also functions as an operator panel interface for collecting status and control information from components of the system 100, while providing a reporting structure to operators about faults involving those components. For example, the RCU 200 provides a communications interface to a primary console 124 and secondary console 126, each of which allows a computer operator to access the computer system and conduct typical maintenance functions, such as investigating reported errors and issuing power-up and power-down commands to the system. In connection with these maintenance functions, the RCU 200 provides a maintenance interface to a power system 122 for collecting status and control information relating to power delivered to the system, and for reporting power faults in remote cabinets of the system 100. Data collectors 130 and central cabinet cards 132 located throughout the system provide additional information to the RCU, which stores and thereafter forwards the information, upon request, to operators located either on-site at the consoles 124 and 126 or off-site at a remote location.

Remote access to the fault-tolerant computer system 100 is provided over a remote service network 128 connected to the RCU. The remote service network (RSN) 128 is a communications circuit that includes a modulator-demodulator device coupled to a communications channel over a conventional RS-232 compatible interchange circuit. Specifically, the RSN 128 allows an off-site operator to perform maintenance functions on the computer system from a remote location, instead of on-site at the consoles. This feature of the invention is particularly significant for system applications that do not require high availability during non-working hours, such as weekends. For these applications, the off-site operator may access the system via the RSN 128 to initiate power down/up procedures that disable/enable the system clock unit 120 at predetermined times to conserve energy and reduce costs.

When disabling the system clock unit, an operator must be able to continually access the system for purposes of performing maintenance functions associated with various components not connected to the system bus 110. In addition, the operator must be able to access certain information relating to the "state" of the system, which information is preferably stored in memory devices resident on the RCU. Accordingly, the RCU contains an on-board, local clock unit for providing low-power, clock pulses to ensure that the circuits of the RCU 200 are continuously "running" despite the absence of system clock pulses.

Figure 2:
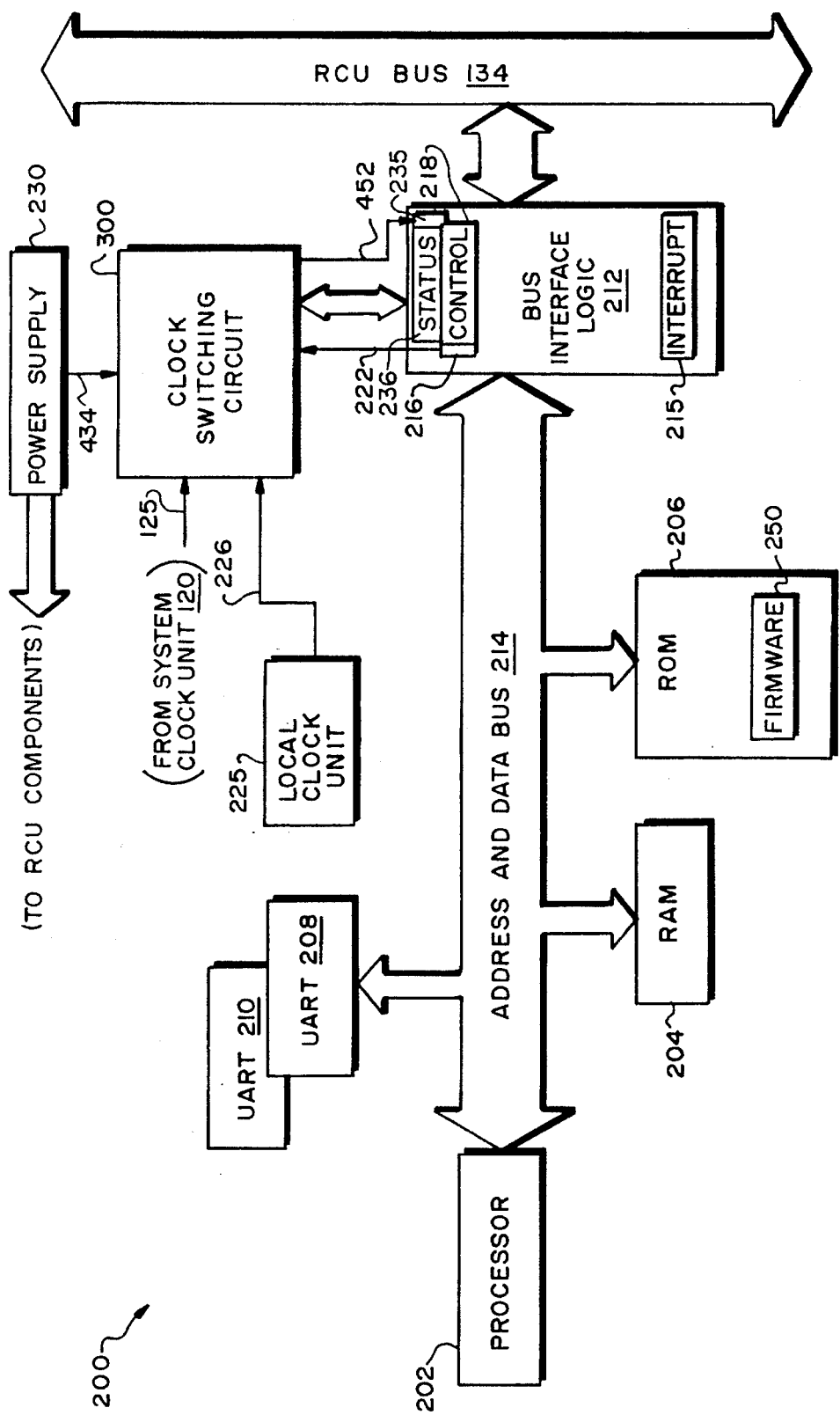
FIG. 2 is a block diagram of a remote connector unit including the novel clock switching circuit of the invention.

FIG. 2 is a block diagram of the RCU 200 including a processor 202, a random access memory (RAM) array 204, a read only memory (ROM) array 206, two universal asynchronous receiver-transmitter (UART) units 208 and 210, and a bus interface logic unit 212 interconnected by a local address and data bus 214. A conventional power supply 230 preferably supplies power to these and other components of the RCU 200.

The processor 202 generally controls the operation of the RCU 200 by, inter alia, functioning as a master of the local bus 214. Additionally, the processor 202 responds to and services interrupt requests from the UARTs 208 and 210, while also executing read and write operations to memory locations in the RAM 204. Communication between the CPUs 102–108 and the processor 202 is primarily conducted through interrupt control registers 215 in the bus interface logic 212.

The RAM 204 is used to temporarily store information, including status and control information received from components of the computer system that may be accessed by an operator when performing system maintenance functions. In contrast, the ROM 206 contains "firmware" 250, i.e., microprogram instructions, needed to control the operations of the processor 202 and RCU 200. The UARTs 208 and 210 are communications subsystems that transmit and receive asynchronous data from, e.g., the consoles 124, 126 and RSN 128, typically in duplex or half-duplex operations.

The bus interface logic 212 contains address decoding logic, chip select logic and output enable logic circuits, along with various registers that are addressable by the processor 202 and other components of the RCU. In addition, the interface logic 212 contains the data path logic and physical connections needed to ensure that the RCU 200 meets the timing and electrical characteristics required to communicate on the RCU bus 134.

As noted, the RCU 200 also includes a local clock unit 225 that is preferably a 32 MHz oscillator configured to generate a stream of 32 MHz local clock pulses. In accordance with the invention, a novel clock switching circuit 300 receives these local clock pulses over a line 226, along with system clock pulses over a line 125 and, in response to disabling and subsequent enabling of the system clock unit 120, switches between these pulses in a manner that does not compromise the integrity of clock pulses provided to the bus interface logic 212 and to other components of the RCU and computer system.

Figure 3:
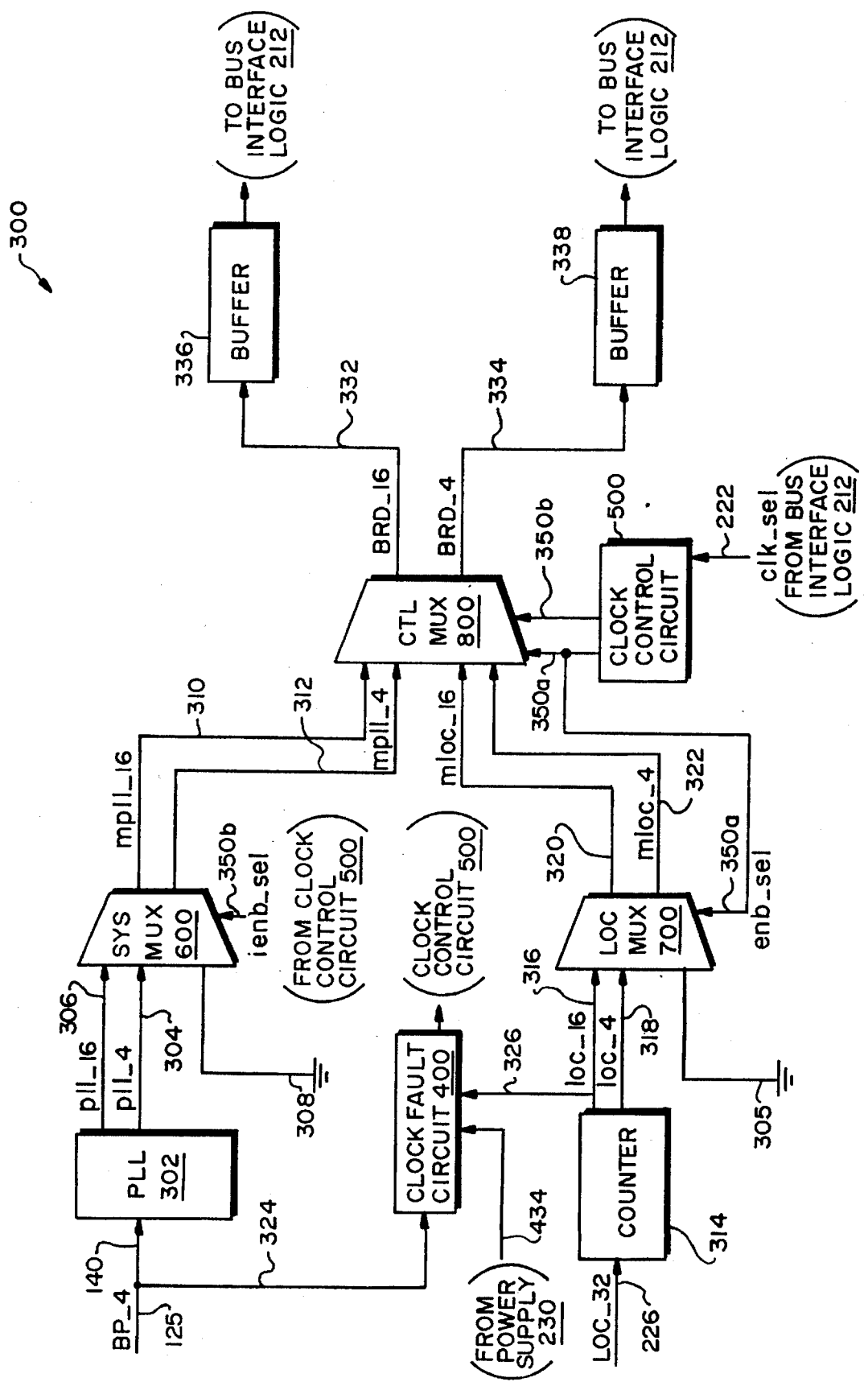
FIG. 3 is a schematic block diagram of the clock switching circuit, including a system multiplexer, a local multiplexer and a control multiplexer in accordance with the invention.

FIG. 3 is a schematic block diagram of the clock switching circuit 300 comprising a plurality of switching circuits configured and arranged for switching between the system and local clock units. In the illustrative embodiment described herein, the switching circuits preferably comprise a plurality of interconnected multiplexer circuits; however, it will be understood to those skilled in the art that other switching circuits may be employed within the teachings of the present invention.

Briefly, the multiplexer circuits include a first system multiplexer (SYS MUX) 600 configured to select between system clock pulses generated by the system clock unit 120 and logical ground. Similarly, a second local multiplexer (LOC MUX) 700 is configured to select between local clock pulses generated by the local clock unit 225 and logical ground. A third control multiplexer (CTL MUX) 800 is arranged to receive the outputs of SYS MUX 600 over a first set of input lines and the outputs of LOC MUX 700 over a second set of input lines. Advantageously, as described further herein, SYS MUX 600 and LOC MUX 700 are configured such that either system or local clock signals are constantly present at the outputs of these multiplexers, while CTL MUX 800 is configured to switch between the clock signals propagating over these sets of input lines in a manner that provides a substantially continuous stream of output clock pulses to selected components of the fault-tolerant system 100.

Specifically, clock switching circuit 300 comprises a phase-locked loop (PLL) circuit 302 for receiving a stream of 4 MHz system clock pulses (BP_4) as an input on line 140 (via line 125) and for delivering at its output a stream of 4 MHz clocks pulses (pll_4) on line 304, together with a stream of 16 MHz clock pulses (pll_16) on line 306. Functionally, PLL 302 allows these high-current, low-skew output signals to lock onto the single 4 MHz input clock and, thereafter, PLL 302 distributes those output signals with substantially negative delay to SYS MUX 600, primarily because PLL 302 contains circuit elements that compensate for propagation delays through the SYS MUX 600 and CTL MUX 800. Additionally, an internal multiplier circuit within PLL 302 multiplies the 4 MHz input clock signal and distributes it locally at a higher 16 MHz frequency. An example of a device suitable for use as the PLL 302 is the MC88915 Low Skew CMOS PLL Clock Driver, available from Motorola Inc., 1303 East Algonquin Road, Schaumburg, Ill. 60196. The structure and operation of this PLL circuit are well known and will not be discussed further herein.

As noted, SYS MUX 600 functions as a multiplexer to switch between both the pll_16 clock pulses on line 306 and logical ground, shown at line 308, and the pll_4 clock pulses on line 304 and logical ground. With the exception of propagation delays, the selected input signals pass substantially unchanged through the multiplexer and onto its output as either 16 MHz system clock pulses or "low" signals (mpll_16) on line 310 and as either 4 MHz system clock pulses or low signals (mpll_4) on line 312. The structure and operation of SYS MUX 600 will be discussed in detail in connection with FIG. 6.

A conventional counter circuit 314 divides an incoming stream of 32 MHz local clock pulses (LOC_32) on line 226 by $2^n$ to produce two streams of output clock pulses having frequencies that are predetermined fractions of the 32 MHz input frequency. Specifically, a first internal circuit of the counter 314 divides the incoming LOC_32 clock pulses by $2^1$ to produce an output stream of 16 MHz local clock pulses (loc_16) on line 316, while a second internal circuit divides the incoming clock pulses by $2^3$ to generate 4 MHz local clock pulses (loc_4) on line 318. These clock pulses are provided as inputs to LOC MUX 700, which switches between these signals and logical ground on line 305 to deliver either 16 MHz local clock pulses or low signals (mloc_16) on line 320 and either 4 MHz local clock pulses or low signals (mloc_4) on line 322. The structure and operation of LOC MUX 700, which is substantially similar to SYS MUX 600, will be described further herein in connection with FIG. 7.

Figure 4:
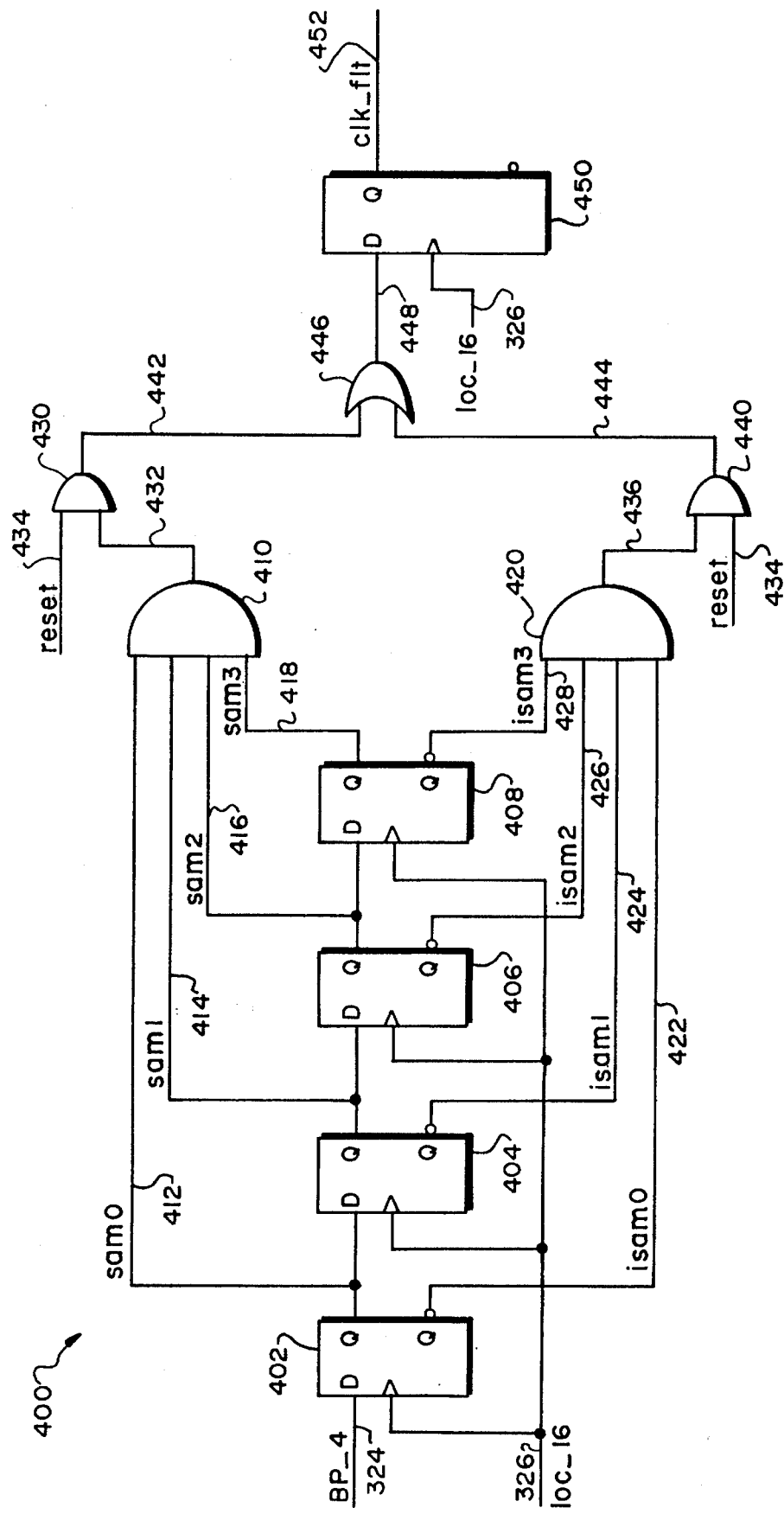
FIG. 4 is a detailed circuit schematic diagram of a clock-fault circuit in accordance with the invention.

Clock pulses BP_4 and loc_16 are also provided to a novel clock-fault circuit 400 over lines 324 and 326, respectively. The clock-fault circuit 400 is primarily utilized in connection with "powering-up" of the system prior to switching from the local clock unit 225 back to the system clock unit 120. A detailed circuit schematic diagram of the clock-fault circuit 400 is shown in FIG. 4 and includes a plurality of D-type flip flop devices 402–408 configured and arranged as a shift register.

Specifically, the D-input of the first device 402 is connected to BP_4 on line 324 and, thereafter, the Q-output of each device 402–408 is tied to the D-input of an adjacent device. That is, the Q-output of device 402 is tied to the D-input of device 404; the Q-output of device 404 is tied to the D-input of device 406; and the Q-output of device 406 is tied to the D-input of device 408. The loc_16 clock pulses on line 326 are provided to the clocking inputs of each of the devices 402–408 and sequence these devices to pass, in tandem, the BP_4 pulses onto each of their data inputs. In addition, the Q-outputs of the devices 402–408 are coupled to a 4-input AND gate 410 over lines 412–418, respectively, while the inverted Q-outputs of these devices are provided as inputs to AND gate 420 over lines 422–428. The lines 412–418 are labeled sam0–sam3, respectively, and the lines 422–428 are labeled isam0–isam3, respectively.

The output of AND gate 410 is provided as one input over line 432 to a 2-input AND gate 430, while the other input is a reset signal on line 434. Specifically, the reset signal is asserted "low" by power supply 230 when it is not functioning correctly, particularly during reset of the supply. The reset signal on line 434 is also an input to an AND gate 440, which has the output of AND gate 420 on line 436 coupled thereto as a second input. The outputs of AND gates 430 and 440 on lines 442 and 444 are coupled to the inputs of OR gate 446, whose output is fed to the D-input of flip-flop device 450 over line 448. The loc_13 16 clock signal on line 326 "clocks" device 450 to generate a clock-fault (clk_flt) signal at the Q-output of device 450 on line 452. The clk_flt signal is stored as a clock-fault bit 235 in a status register 236 located on the bus interface logic 212 (FIG. 2).

Operationally, the clock-fault circuit 400 constantly samples the output of system clock unit 120 on line 324 (via line 125) in search of a transition in the system clock pulses BP_4 at discrete time intervals, e.g., sam0–sam3 and isam0–isam3. Sampling is conducted relative to the local clock loc_16 to determine whether a pulse transition occurs during those intervals. If a transition in the BP_4 clock signals is detected, the clock-fault circuit 400 generates the clk_flt signal that is stored as a deasserted clock-fault bit 235 in the status register 236. Firmware 250 resident in ROM 206 of the RCU 200 "polls" on this bit until it is asserted, at which time the firmware notifies the processor 202 that the system clock has reappeared and that a "switch-to-system clock" operation will issue, as described further herein.

Referring again to FIG. 3, the mpll_16 and mpll_4 clock signals are provided over a first set of input lines 310 and 312 to CTL MUX circuit 800, while the mloc_16 and mloc_4 signals are provided as a second set of input lines 320 and 322 to that multiplexer. CTL MUX 800 switches between these local and system clock signals to deliver output clock signals BRD_16 and BRD_4 on lines 332 and 334 to buffer circuits 336 and 338, respectively, for distribution to various components of the computer system 100. An example of a buffer circuit suitable for use in the circuits 336 and 338 is a MC10H646 PECL/TTL-TTL 1:8 Clock Distribution circuit, available from Motorola Inc., 1303 East Algonquin Road, Schaumburg, Ill. 60196. The structure and operation of this circuit are well known and, thus, will not be discussed.

Figure 5:
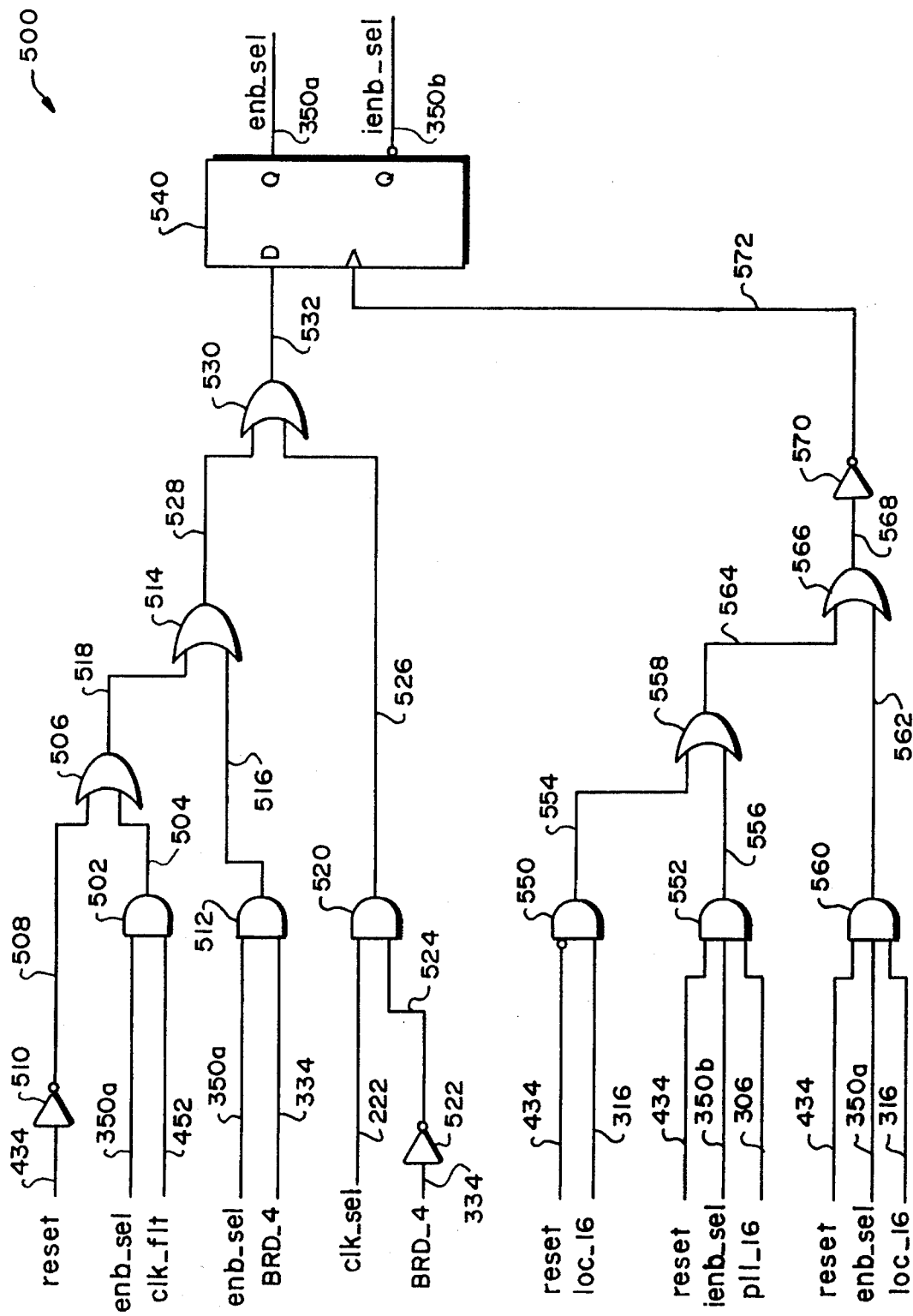
FIG. 5 is a detailed circuit schematic diagram of a clock control circuit in accordance with the invention.

CTL MUX 800 is generally controlled by enable signals generated by a novel clock control circuit 500 and provided to the multiplexer 800 over lines 350a,b. FIG. 5 is a detailed circuit schematic diagram of the clock control circuit 500 which includes a plurality of logic stages for generating enable select (enb_sel) and inverted enable select (ienb_sel) signals on lines 350a,b. In accordance with an aspect of the present invention, the clock control circuit 500 enables CTL MUX 800 to switch between its sets of input lines without adversely impacting the integrity of the clock pulses emanating from the multiplexer 800. That is, the clock control circuit 500 ensures that switching occurs when the input signals to CTL MUX 800 are "low".

Referring to the schematic diagram of FIG. 5, the reset signal on line 434 is coupled from the power supply 230 to the input of inverter circuit 510. The enb_sel signal on 350a is fed back as one input to a 2-input AND gate 502, whose other input is the clk_flt signal on line 452. The output of AND gate 502 on line 504 is provided as one input to OR gate 506, which has as another input the output of inverter 510 on line 508.

The enb_sel signal on line 350a is also provided as an input to AND gate 512 having as another input BRD_4 on line 334. The output of AND gate 512 is coupled to one input of OR gate 514 on line 516 and the output of OR gate 506 is coupled as a second input to OR gate 514 over line 518. The signal BRD_4 on line 334 is coupled to the input of inverter 522, whose output on line 524 is connected to one input of 2-input AND gate 520; the other input of gate 520 is the signal clk_sel on line 222. Thereafter, the output of AND gate 520 on line 526 is connected to one input of OR gate 530 and the output of OR gate 514 is connected to another input of gate 530 over line 528, while the output of OR gate 530 is tied to the D-input of D-type flip flop device 540 over line 532.

The reset signal on line 434 is connected to an inverted input of AND gate 550, which has another input connected to signal loc_16 on line 316. The reset signal 434 is also connected as one input to 3-input AND gate 552 having as the other inputs the ienb_sel signal on line 350b and the pll_16 signal on line 306. The outputs of AND gates 550 on line 554 and AND gate 552 on line 556 are connected as inputs to OR gate 558.

The reset signal on line 434 is further connected as an input to AND gate 560, which has the enb_sel signal on line 350a and the loc_16 signal on line 316 as its other inputs. The output of AND gate 560 on line 562 is connected as one input to OR gate 566 and the output of OR gate 558 on line 564 is connected to gate 566 as a second input. The output of OR gate 566 on line 568 is fed to an inverter circuit 570 whose output on line 572 is the clocking input to D-type device 540. As noted, the Q-output of device 540 is the enb_sel signal on line 350a and the inverted Q-output of device 540 is the ienb_sel signal on 350b.

Operation of the clock control circuit 500 will now be described in connection with a "power-down" sequence of the system 100. Upon issuance of a power-down command, the firmware 250 resident in ROM 206 instructs the processor 202 to assert a clock selection bit 216 in a control register 218 of the bus interface logic 212. This clock selection bit 216 is accessed by the clock control circuit as a clock selection (clk_sel) signal on line 222. In response to the asserted clk_sel signal, the clock control circuit 500 generates the enable signals, of which the signal enb_sel is initially used to configure the CTL MUX to switch between its input lines to pass (low) local clock input signals onto the output lines of CTL MUX. In accordance with the invention, this operation of the circuit obviates any adverse consequences to the integrity of the signals delivered from the CTL MUX. The enb_sel and ienb_sel signals thereafter configure the LOC MUX and SYS MUX, respectively, to switch between their input lines, thereby passing local clock pulses onto and through the CTL MUX 800.

As is apparent from the circuit 500, the enable signals, generally referred to at 350, are derived, in part, from the clk_sel signal on line 222. Specifically, the enable signals are used to configure the multiplexers of the clock switching circuit 300 to switch between their input clock signals at appropriate times. The multiplexers SYS MUX, LOC MUX and CTL MUX, as described below, are preferably constructed using three (3) programmable logic device (PLD) circuits, and are further synchronized to each other in relation to these enable signals and the clock pulses of the currently selected clock unit. That is, the LOC MUX PLD is preferably sequenced by the enb_sel signal and local clock pulses, while the SYS MUX PLD is preferably sequenced by the ienb_sel signal and system clock pulses (when available). According to another aspect of the present invention, the CTL MUX PLD "obeys" each of the enable signals and local/system clock pulses, depending upon which clock unit is currently selected. For ease of depiction and description herein, these PLDs will be described discretely as multiplexer circuits of the clock switching circuit 300.

Figure 6:
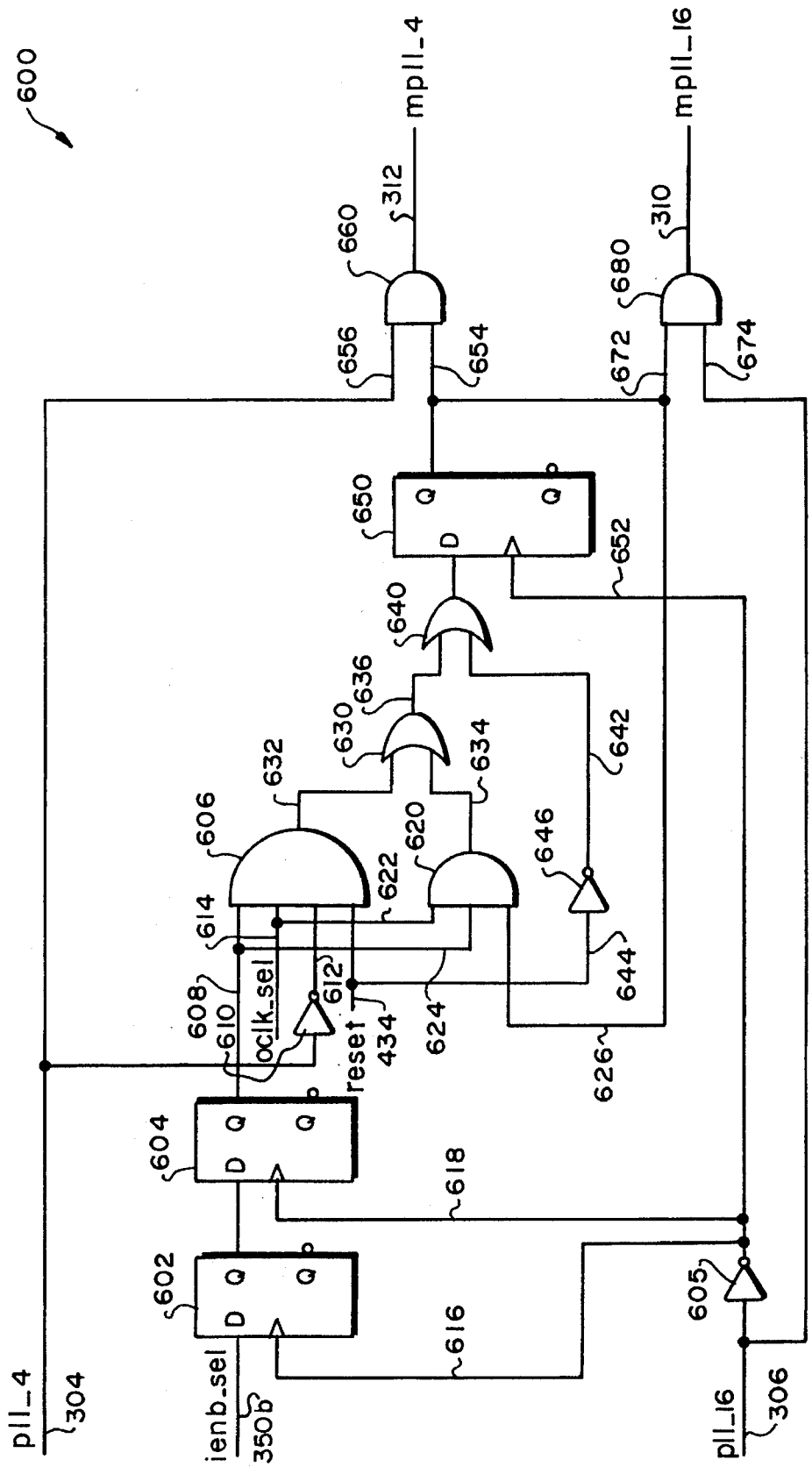
FIG. 6 is a detailed circuit schematic diagram of the system multiplexer of FIG. 3.

FIG. 6 is a detailed circuit schematic diagram of the SYS MUX 600 comprising a plurality of logic stages. Specifically, the signal ienb_sel on line 350b is fed to the data input of a D-type flip-flop device 602, whose Q-output is tied to the D-input of D-type flip-flop device 604. Each of the devices 602 and 604 is clocked by inverted 16 MHz system clock pulses on lines 616 and 618, respectively, the inverted clock pulses being generated by an inverter circuit 605 having as an input the pll__16 signal on line 306. The Q-output of device 604 is coupled to one input of a 4-input AND gate 606 over line 608. Another input to AND gate 606 is inverted 4 MHz system clock pulses on line 612. These inverted clock pulses are produced as a result of system clock pulses pll__4 being provided to an inverter circuit 610. The remaining inputs to AND gate 606 are the reset signal on line 434 and a special signal, oclk__sel on line 614, that is generated by a redundant clock control circuit (not shown), similar to the clock control circuit 500 of an identical clock switching circuit on the RCU 200. The signal oclk__sel is significant to the overall operation of the fault-tolerant system since it ensures simultaneous switching by the redundant clock switching circuits.

The oclk__sel signal is also provided over line 622 as an input to a 3-input AND gate 620 having as additional inputs the Q-output of device 604 on line 624 and a first feedback signal on line 626. The outputs of AND gate 606 on line 632 and AND gate 620 on line 634 are coupled to the inputs of OR gate 630, and the output of OR gate 630 is coupled to one input of OR gate 640 on line 636. A second input to OR gate 640 is an inverted reset signal on line 642 that is generated by coupling the reset signal on line 644 to an input of inverter 646. The output of OR gate 640 is tied to the D-input of D-type flip flop device 650, whose clocking input is coupled to the inverted 16 MHz system clock pulses pll__16 on line 652. The Q-output of device 650 is provided, via line 626, as the first feedback signal to AND gate 620, as previously described.

The Q-output signal is also coupled, via line 654 to an input of an AND gate 660, having as another input the pll__4 signal on line 656, and the output of AND gate 660 is the signal mpll__4 on line 312. The Q-output of device 650 is further provided to one input of AND gate 680 over line 672 and a second input to that gate is the signal pll__16 on line 674. The output of AND gate 680 is the mpll__16 clock signal on line 310.

Figure 7:
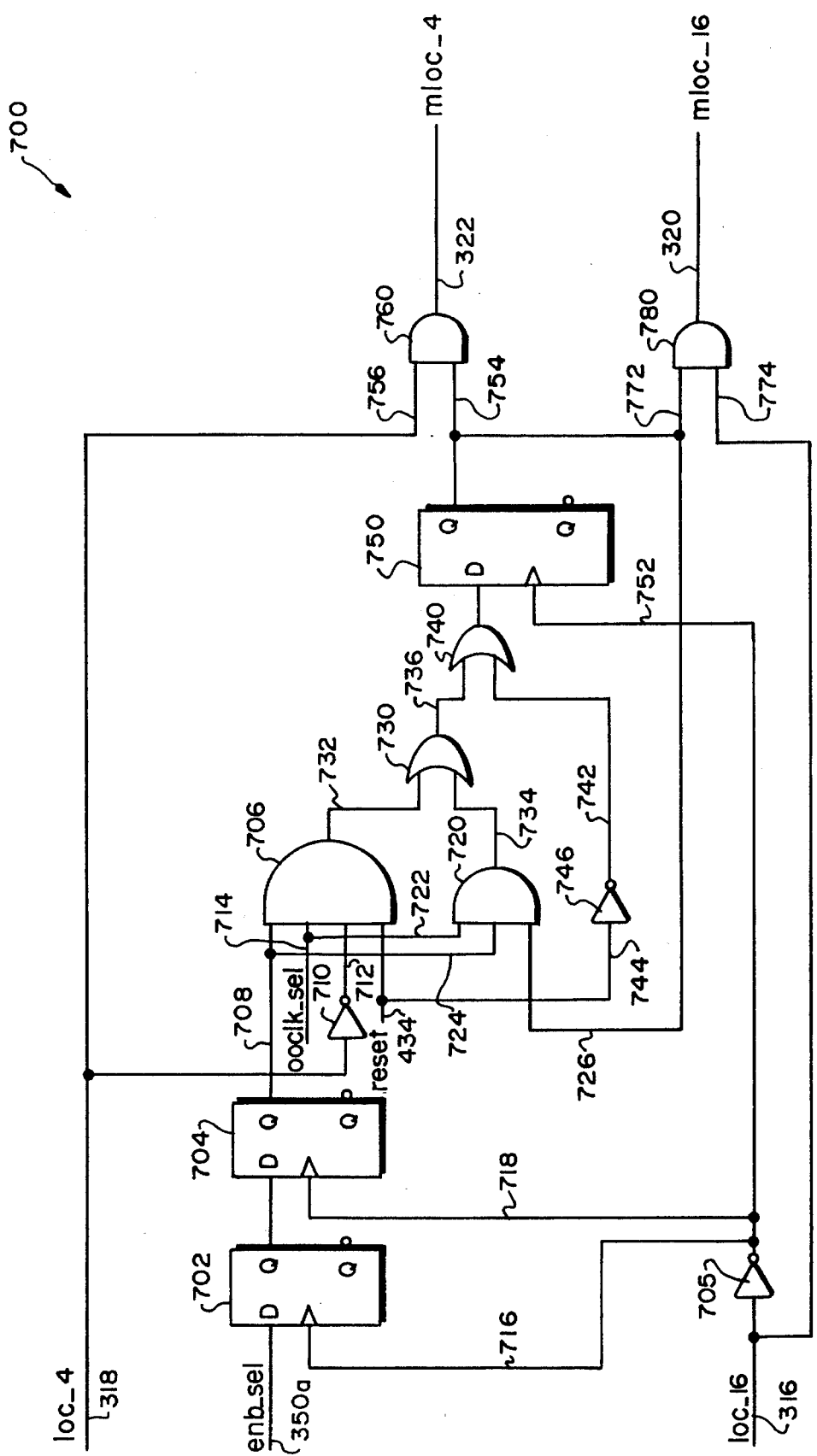
FIG. 7 is a detailed circuit schematic diagram of the local multiplexer of FIG. 3.

FIG. 7 is a detailed circuit schematic diagram of LOC MUX 700, which is generally similar in structure and function to SYS MUX 600 described above. Specifically, the signal enb__sel on line 350a is fed to the data input of a D-type flip-flop device 702, whose Q-output is tied to the D-input of D-type flip-flop device 704. Each of these devices is clocked by inverted 16 MHz system clock pulses on lines 716 and 718, respectively, the inverted clock pulses being generated by an inverter circuit 705 having as an input the loc__16 signal on line 316. The Q-output of device 704 is coupled to one input of a 4-input AND gate 706 over line 708. Another input to AND gate 706 are inverted 4 MHz local clock pulses on line 712. These inverted clock pulses are generated as a result of local clock pulses loc__4 being provided to an inverter circuit 710. The remaining inputs to AND gate 706 are the reset signal on line 434 and another special signal, ooclk__sel on line 714 from the redundant clock control circuit on the RCU 200.

The ooclk__sel signal is also provided over line 722 as an input to a 3-input AND gate 720 having as additional inputs the Q-output of device 704 on line 724 and a second feedback signal on line 726. The outputs of AND gate 706 on line 732 and AND gate 720 on line 734 are coupled to the inputs of OR gate 730, whose output is coupled to one input of OR gate 740 on line 736. A second input to OR gate 740 is an inverted reset signal on line 742 that is generated by coupling the reset signal on line 744 to an input of inverter 746.

The output of OR gate 740 is tied to the D-input of D-type flip flop device 750, whose clocking input is coupled to the inverted local clock pulses loc__16 on line 752. The Q-output of device 750 is provided, via line 726, as the second feedback signal to AND gate 720, as previously described. The Q-output signal is also coupled, via line 754 to an input of AND gate 760, having as another input the loc__4 signal on line 756, and the output of AND gate 760 is the mloc__4 signal on line 322. The Q-output of device 750 is further provided to one input of AND gate 780 over line 772 and a second input to that gate is the signal loc__16 on line 774. The output of AND gate 780 is the mloc__16 clock signal on line 320.

Figure 8:
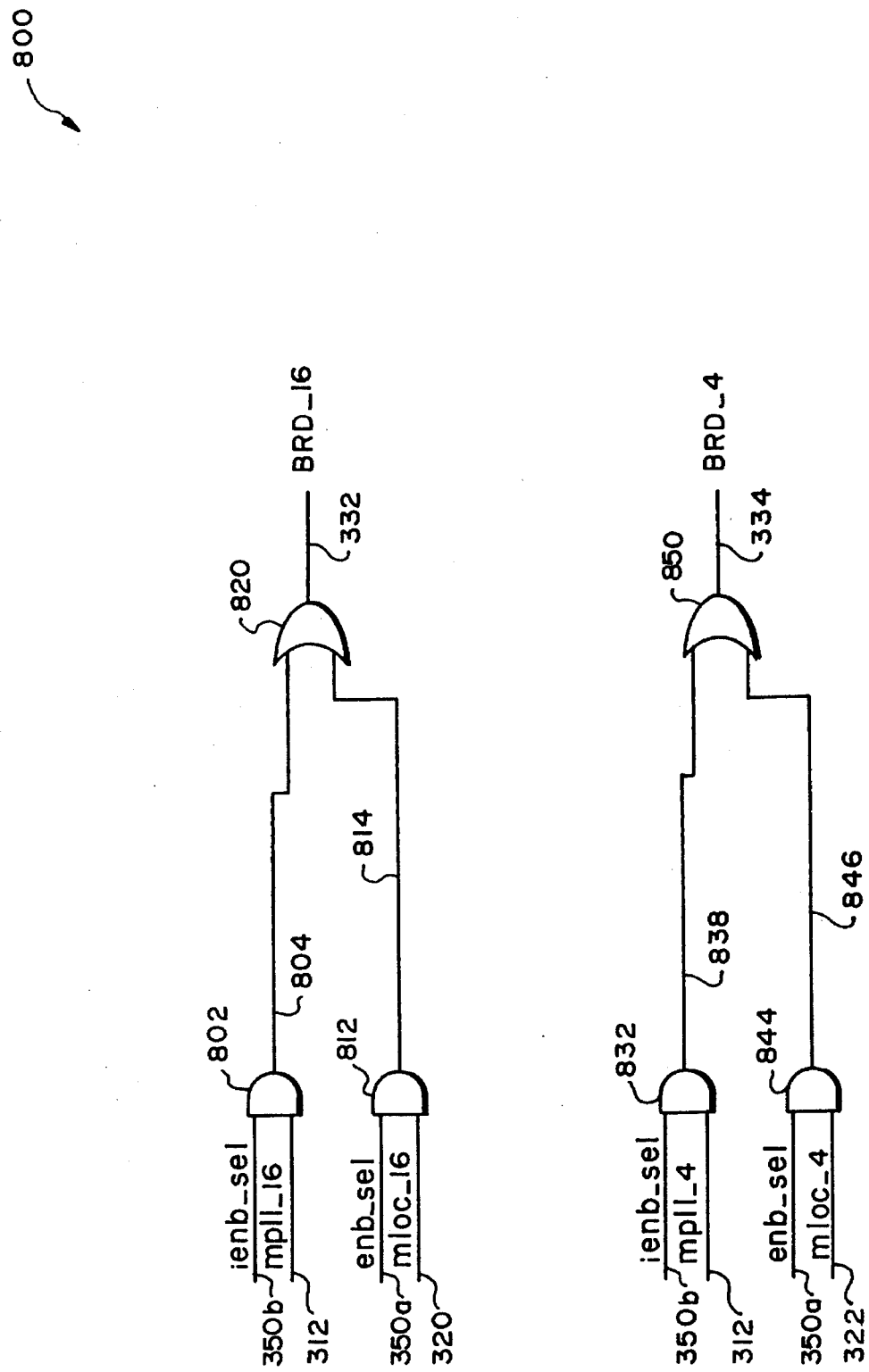
FIG. 8 is a detailed circuit schematic diagram of the control multiplexer of FIG. 3.

FIG. 8 is a detailed circuit schematic diagram of the CTL MUX 800. Here, the ienb__sel signal on line 350b is provided as one input to AND gate 802, which has a second input coupled to the mpll__16 signal on line 312. The output of AND gate 802 is coupled to a first input to OR gate 820 over line 804. The enb__sel signal on line 350a is connected to one input of 2-input AND gate 812 having as a second input the signal mloc__16 on line 320. The output of AND gate 812 is connected to a second input of OR gate 820 over line 814, while the output of OR gate 820 is the signal BRD__16 on line 332.

Similarly, the signal ienb__sel on line 350b is connected to one input of 2-input AND gate 832, while the second input is the mpll__4 signal on line 312. The output of AND gate 832 is provided to an input of 2-input OR gate 850 over line 838. The enb__sel signal on line 350a is connected to one input of 2-input AND gate 844 and its second input is coupled to the mloc__4 signal on line 322. The output of AND gate 844 is then provided to the other input to OR gate 850 over line 846 and the output of OR gate 850 is the BRD__4 signal on line 334.

In the default case of the clock switching circuit 300 (FIG. 3), which preferably occurs after issuance of the power-down command, the enb__sel signal enables the LOC MUX 700 to pass the local clock pulses loc__16 and loc__4 through that multiplexer and onto the set of input lines 320 and 322 to CTL MUX 800. In addition, the ienb__sel signal configures SYS MUX 600 to inhibit clock pulses generated by the system clock unit 120 from proceeding to the output lines of the multiplexer 600; accordingly, low, logical ground signals are passed through SYS MUX 600 and onto its output lines 310 and 312. Previously, the enb__sel signal has configured CTL MUX 800 to pass the local (low) signals on lines 320 and 322 to its output on lines 332 and 334 as output clock signals BRD__6 and BRD__4. After switching of the LOC MUX and SYS MUX has occurred, however, the local clock pulses are distributed to buffer circuits 336 and 338, respectively, and forwarded onto bus interface logic 212.

Later upon issuance of the power-up command, the clock-fault circuit 400 generates a deasserted clk__flt signal when the system clock reappears. The firmware resident in ROM 206 of RCU 200 detects the deassertion of this signal and notifies the processor 202 to wait for an interrupt from one of the CPUs 102–108, which preferably writes to an interrupt control register 215 in the bus interface logic 212, before initiating a local clock-to-system clock switch operation. Upon receiving the interrupt, the firmware deasserts the clock selection bit 216 of the control register 218.

In response to the events described above, synchronization between the system and local clock units commence with CTL MUX 800 being enabled by the ienb__sel signal to switch its output over to the set of input lines carrying the system clock signals. However, LOC MUX 700 and SYS MUX 600 are not, at this time, configured to switch their inputs. This sequence of events, which is set forth in the timing diagram of FIG. 9, creates a condition during which the output clock signals of CTL MUX 800 are "low". In accordance with yet another aspect of the invention, this is the appropriate time to switch between input clock signals so as to avoid introducing transient pulses of short duration which interrupt operation of the computer system 100.

Thereafter, SYS MUX 600 and LOC MUX 700 are enabled by the ienb_sel and enb_sel signals to switch their inputs; accordingly, the signals pll_16 on line 306 and pll_4 on line 304 are passed through SYS MUX 600 to its output as mpll_16 and mpll_4 signals on lines 310 and 312, respectively, while low, logical ground signals are passed through LOC MUX 700 and onto its output lines 320 and 322. After propagation delays through the SYS MUX 600 and CTL MUX 800, these system clock pulses are transferred through CTL MUX 800 and onto its output lines 332 and 334, respectively, as BRD_16 and BRD_4 clock signals.

Figure 9:
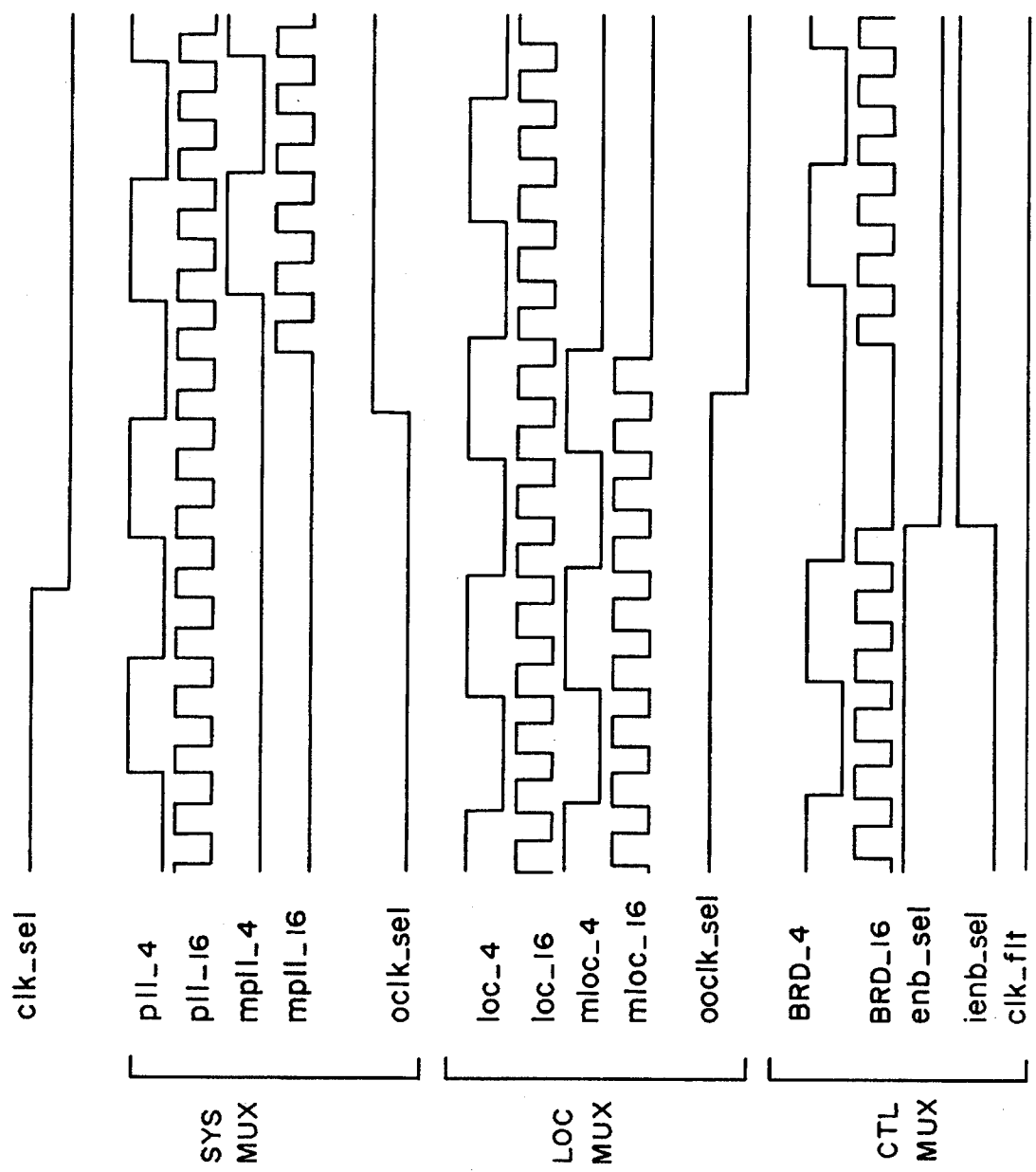
FIG. 9 is a timing diagram illustrating the relationship of control and data signals transferred throughout the clock switching circuit of the invention.

The entire operation of the clock switching circuit 300, including the relationship of the control and data signals transferred throughout that circuitry, may be better understood from the timing diagram of FIG. 9. Here, the clk_sel signal is asserted "high" when the RCU 200 is sequenced by the local clock unit 225 and is aleasserted "low" when the hardware and software of the RCU identify the presence of system clock pulses at the clock-fault circuit 400.

Initially, the ienb_sel signal is asserted "low" on the CTL MUX section of waveforms, thus inhibiting the pll_4 and pll_16 signals from propagating through SYS MUX 600 to its output, as indicated by the absence of system clock pulses on the mnpll_4 and mpll_16 lines of the SYS MUX section of waveforms. Meanwhile, the loc_4 and loc_16 clock pulses of the LOC MUX section of waveforms propagate into and through LOC MUX 700 onto its output lines as mloc_4 and mloc_16 signals, respectively, in response to the enb_sel signal being asserted "high". Similarly, the output signals BRD_4 and BRD_16 from the CTL MUX 800 assume the state of the mloc_4 and mloc_16 clock signals because that multiplexer is sequenced by the enb_sel signal; however, as can be seen from the diagram, the BRD_4 and BRD_16 signals are slightly delayed from the positions of their respective mloc_4 and mloc_16 signals as a result of propagation delays through the LOC MUX and CTL MUX.

Later, when the clk_sel signal is deasserted "low", the states of the enb_sel and ienb_sel signals follow a short time thereafter by changing their states, with enb_sel being asserted "low" and ienb_sel being asserted "high". Significantly, the output clock signal BRD_16 from the CTL MUX 800 transitions "low" simultaneously with the state change of the enb_sel and ienb_sel signals because the BRD_16 clock signals are "running" the CTL MUX. It should be noted, however, that all of the multiplexers (when implemented in the PLDs) use negative edges of the clock signals to ensure that suppression of the clock signals occurs after the trailing edges of those signals, i.e., when these signals assume a "low" state. In accordance with the principles of the invention, this obviates generation of short pulses that disrupt operation of the computer.

Subsequent to the enable signals altering state coincident with the BRD_16 signal, this latter clock signal maintains a low state, together with the BRD_4 clock signal, for a predetermined amount of time as switching occurs in the clock switching circuit 300. During this time, the CTL MUX is configured to respond to the altered ienb_sel signal and switches between its input lines to pass the mpll_4 and mpll_16 system clock signals. A short time later, the altered enb_sel signal configures the LOC MUX 700 to inhibit propagation of the loc_4 and loc_16 signals to the output signals mloc_4 and mloc_16 of that multiplexer, as indicated in the diagram. However, the altered ienb_sel signal configures SYS MUX 600 to pass the input signals pll_4 and pll_16 to the outputs mpll_4 and mpll_16 of multiplexer 600, and through to the output of CTL MUX 800 as BRD_4 and BRD_16 clock signals, respectively. Again, the BRD_4 and BRD_16 output clock signals are slightly delayed from the pll_4 and pll_16 input signals due to propagation delays through SYS and CTL MUXs.

In summary, the timing diagram of FIG. 9 illustrates a "power-up" procedure for enabling the system clock unit 120. It should be noted that upon a "powering-down" sequence of the system clock unit, the clk_sel signal will be reversed, i.e., deasserted "low" initially and then asserted "high" at substantially the same transition location as shown for that signal in FIG. 9. Similarly, the transitions of the enb_sel and ienb_sel signals will be reversed, as will the presence of the mpll_4 and mpll_16 clock signals through the SYS MUX 600, and the mloc_4 and mloc_16 signals through the LOC MUX 700. Finally, the presence of the slightly delayed mpll_4 and mpll_16 clock signals at the BRD_4 and BRD_16 outputs, as well as the mloc_4 and mloc_16 clock signals at those outputs, will be reversed from the current CTL MUX waveforms.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A clock switching circuit for switching between clock signals generated by one of a local clock unit and a system clock unit when disabling and subsequently enabling the system clock unit, said clock switching circuit comprising:

a first multiplexer configured to pass one of system clock signals generated by the system clock unit and logical ground signals onto output lines of said first multiplexer;

a second multiplexer configured to pass one of local clock signals generated by a local clock unit and logical ground signals onto output lines of said second multiplexer, said first and second multiplexers being further configured such that one of said system and local clock signals pass onto said output lines;

a third multiplexer arranged to receive one of said system and local clock signals from said output lines coupled to first and second sets of input lines of said third multiplexer, said third multiplexer further configured to couple one of said first and second sets of input lines to third output lines of said third multiplexer for passing one of said system and local clock signals onto said third output lines; and clock control means for generating enable signals that configure said third multiplexer to switch from said one of said sets of input lines to the other of said sets of input lines so as to pass the other of said system and local clock signals onto said third output lines without adversely impacting the integrity of said clock signals passing through said third multiplexer.

2. The clock switching circuit of claim 1 wherein said multiplexers comprise a plurality of logic stages and wherein said enable signals comprise an enable select signal and an inverted enable select signal.

3. The clock switching circuit of claim 2 wherein said logic stages of said first multiplexer are sequenced by said inverted enable select signal.

4. The clock switching circuit of claim 3 wherein said logic stages of said second multiplexer are sequenced by said enable select signal.

5. The clock switching circuit of claim 4 wherein said logic stages of said third multiplexer are sequenced by one of said inverted enable select signal when passing said system clock signals onto said third output lines and said enable select signal when passing said local clock signals onto said third output lines.

6. The clock switching circuit of claim 1 further comprising a phase-locked loop circuit, coupled to said first multiplexer, for receiving a stream of input system clock pulses having a first frequency and for delivering a first stream of output system clock pulses at said first frequency along with a second stream of output system clock pulses at a higher, predetermined frequency.

7. The clock switching circuit of claim 6 further comprising a counter circuit, coupled to said second multiplexer, for dividing a stream of input local clock pulses having a third frequency by $2^n$ to produce a plurality of streams of output local clock pulses having predetermined fractions of said third frequency.

8. The clock switching circuit of claim 7 further comprising a clock-fault circuit receiving at one input said stream of input system clock pulses and, at a second input, one of said plurality of streams of output clock pulses from said counter circuit, said clock-fault circuit sampling said stream of input system clock pulses at predetermined time intervals to detect a pulse transition and, in response to detecting said pulse transition, generating a clock-fault signal.

9. The clock switching circuit of claim 8 wherein said clock-fault circuit comprises a plurality of D-type flip flop devices configured and arranged as a shift register.

10. A remote connector unit configured to receive power-down and power-up commands for respectively disabling and enabling a system clock unit of a fault-tolerant computer, said system clock unit configured to deliver a stream of system clock pulses at an output thereof, said remote connector unit comprising:

a processor for generally controlling the operations of said remote connector unit;

bus interface logic coupled to said processor and containing a plurality of addressable registers;

a local clock unit for generating a stream of local clock pulses; and clock selecting means, coupled between said bus interface logic and said local clock unit, for receiving said streams of local and system clock pulses and for selecting between said streams to provide one of said local and system clock pulses to said bus interface logic.

11. The remote connector unit of claim 10 wherein one of said addressable registers is a control register containing a clock selection bit generated by said processor in response to issuance of said power-down command.

12. The remote connector unit of claim 11 further comprising clock control means, coupled to said clock selecting means, for generating enable signals in response to said clock selection bit, said enable signals configuring said clock selecting means to provide said local clock pulses to said bus interface logic.

13. The remote connector unit of claim 10 further comprising clock-fault detection means, coupled to said clock selecting means, for sampling said output of said system clock unit at predetermined time intervals to detect a pulse transition within said stream of system clock pulses.

14. The remote connector unit of claim 13 wherein another of said addressable registers is a status register containing a clock-fault bit generated by said clock-fault detection means in response to detection of said pulse transition.

15. The remote connector unit of claim 14 further comprising clock control means, coupled to .said clock selecting means, for generating altered enable signals in response to said clock-fault bit, said altered enable signals configuring said clock selecting means to provide said system clock pulses to said bus interface logic.

16. A method for disabling and subsequently enabling a system clock unit of a fault-tolerant computer in response to respective power-down and power-up commands received at a remote connector unit of the computer, said method comprising the steps of:

generating a first stream of local clock pulses at a local clock unit and a second stream of system clock pulses at a system clock unit;

receiving said first ;and second streams of clock pulses at a clock switching circuit;

selecting said first stream and passing said local clock pulses to an output of said clock switching circuit in response to an enable selection signal generated by a clock control circuit;

scanning said stream of system clock pulses at a clock-fault circuit to detect a pulse transition;

deasserting a clock-fault signal at said clock-fault circuit in response to detection of said pulse transition; and switching from said first stream to said second stream and passing said system clock pulses to said output of said clock switching circuit in response to an inverted enable selection signal generated by said clock control circuit.

17. The method of claim 16 further comprising the step of asserting a clock selection signal in response to said power-down command received by a processor of said remote connector unit, said clock control circuit generating said enable selection signal in response to said asserted clock selection signal.

18. The method of claim 16 further comprising the step of deasserting a clock selection signal in response to said power-up command received by a processor of said remote connector unit and said asserted clock-fault signal, said clock control circuit generating said inverted enable selection signal in response to said deasserted clock selection signal.

* * * * *